May 26, 1925.

R. A. CECCHINI

PROTRACTOR LEVEL

Filed Oct. 25, 1922

1,539,543

Robert A. Cecchini, INVENTOR.

BY

Frank A. Cutter, ATTORNEY.

Patented May 26, 1925.

1,539,543

UNITED STATES PATENT OFFICE.

ROBERT A. CECCHINI, OF SPRINGFIELD, MASSACHUSETTS, ASSIGNOR OF ONE-FOURTH TO GEORGE R. CRONIN, OF SPRINGFIELD, MASSACHUSETTS.

PROTRACTOR LEVEL.

Application filed October 25, 1922. Serial No. 596,848.

*To all whom it may concern:*

Be it known that I, ROBERT A. CECCHINI, a citizen of the United States of America, and a resident of Springfield, in the county of Hampden and State of Massachusetts, have invented a new and useful Protractor Level, of which the following is a specification.

My invention relates to improvements in instruments in which protractors and spirit levels are combined, and consists essentially of a base having a support rising therefrom, a protractor pivotally connected with said support, means rigidly to secure said protractor to said support after the former has been adjusted on its pivot, a beam mounted above said protractor on said pivot, adjustable securing means between said protractor and beam, a spirit level mounted on said beam, and means whereby said level can be adjusted about its longitudinal axis, together with such other parts and members as may be necessary or desirable in order to render the instrument complete and serviceable in every respect, all as hereinafter set forth.

The primary object of my invention is to produce an instrument, for use in determining angles and levels, which is comparatively inexpensive and simple in construction, convenient in operation, and strong and durable. This instrument is capable of being applied in practically any position to work of a greatly diversified nature or character, so that its range of usefulness extends throughout most if not all of the crafts.

Another object is to provide my protractor-level with means whereby a micrometer gauge, a scratch gauge, or other more or less similar measuring implements may be mounted on or applied thereto and employed therewith.

Other objects and advantages will appear in the course of the following description.

I attain the objects and secure the advantages of my invention by the means illustrated in the accompanying drawings, in which—

Figure 1:
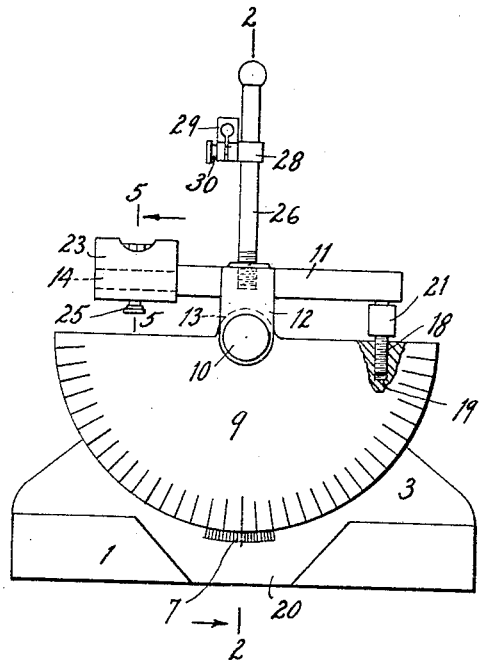
Figure 2:
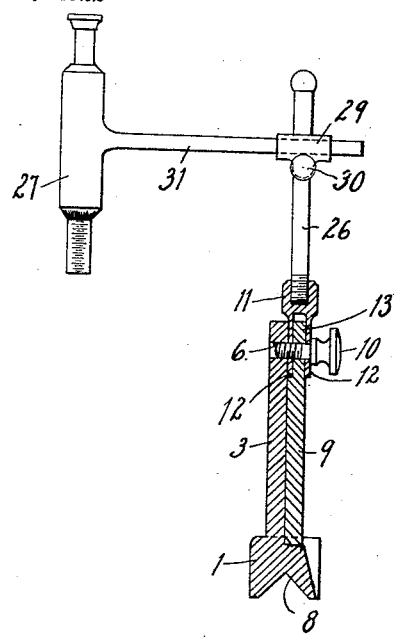
Figure 3:
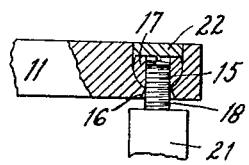
Figure 4:
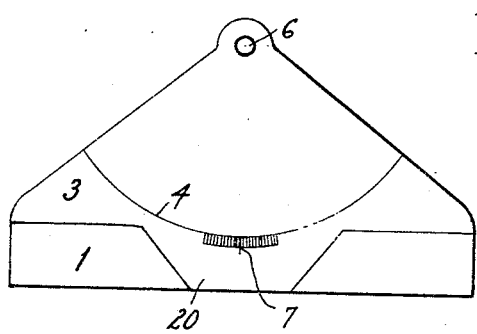
Figure 5:
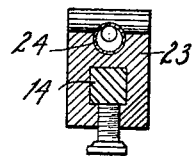

Figure 1 is a front elevation of a protractor-level which embodies a practical form of my invention, a portion of the protractor being broken away to disclose the lower portion of the adjusting screw between said protractor and the spirit-level beam; Fig. 2, a central, transverse, vertical section through said protractor-level, taken on lines 2—2, looking in the direction of the associated arrow, in Fig. 1; Fig. 3, an enlarged detail, in partial section, illustrating the manner in which said adjusting screw is connected with said beam; Fig. 4, a front elevation of the base and support upon which the other members of the instrument are mounted, and, Fig. 5, an enlarged cross section through the spirit level and supporting part of the beam, taken on lines 5—5, looking in the direction of the associated arrow, in Fig. 1.

Similar reference characters designate similar parts throughout the several views.

What may be termed the stand of this protractor-level consists of a base 1 that is preferably rectangular in cross section, and an integral support 3 which rises from said base, is cut away in front to form an arcuate shoulder 4, and has near the top in the transverse, central, vertical plane a screw-threaded opening 6. The front of the base 1 in the center is cut back at 20 to the face of that part of the support 3 that is below the shoulder 4. The support 3 is provided on or in the face thereof, immediately below the shoulder 4 and in the transverse, central, vertical plane of said support, with a pointer or indicator line 7, and any suitable or desirable scale may also be provided in addition to said line. Extending longitudinally of the base 1 in the bottom thereof is an inverted V-shaped groove 8.

A protractor 9, having a radius which corresponds with that of the shoulder 4, and a center opening which is in agreement with the opening 6, is received against the front side of the support 3 above said shoulder, the thickness of said protractor being equal to the width of said shoulder, so that the face of said protractor is flush with the face of the thicker portion of said support. A binding screw 10, which passes through the center opening in the protractor 9 into threaded engagement with the opening 6 in the support 3, serves as a pivot for said protractor, and in the capacity of locking means for the same. The protractor is marked on the face in such a way as to produce any desired scale, and any of such markings can be brought into alignment with the indicator mark 7 by swinging said protractor in one direction or other on the screw or pivot 10.

Superimposed on the protractor 9 is a beam 11. The beam 11 is provided with a pair of intermediate, depending lugs 12, and these lugs are perforated to receive the pivot screw 10, and spaced apart the proper distance to receive between them the central portion of the top of the protractor 9, which portion extends above the straight, upper edge of said protractor, and is indicated by the numeral 13. Thus it is seen that the lugs 12 with the beam 11 can be tilted on the screw 10, and, furthermore, that said screw when tightened in the opening 6 binds the protractor 9 to the support 3, so that said protractor can not be rocked on said screw, the front lug then being forced by the head of the screw against the front of the protractor and the rear lug forced by said protractor against said support.

At one end of the beam 11 is an extension 14 which is square in cross section, and adjacent to the other end of said beam is a recess 15 and an opening 16. The recess 15 opens above through the top of the beam 11, and below through the opening 16 and the bottom of said beam. The bottom of the recess 15 is concave to provide a seat for the convex portion of a head 17, and the opening 16 has conical sides to enable a screw 18, which extends downwardly from the head 17, to move to whatever extent may be required for adjusting purposes. The lower terminal of the adjusting screw 18 is tapped into a passage 19 which opens through the straight edge of the protractor 9 below the terminal of the beam 11 which carries the head 17. The screw 18 is provided with an enlargement 21 to facilitate rotating said screw. In assembling the parts, the head 17 is engaged with the upper terminal of the screw 18, after said terminal has been inserted through the opening 16 into the recess 15.

By turning the adjusting screw 18, in the required direction and to the necessary extent, the beam 11 is brought into exact parallel relationship with the straight edge of the protractor 9, when the head 17 is tightened on said screw against the bottom of the recess 15, and said recess above said head is filled and sealed with wax or other suitable material, as indicated at 22.

A spirit level 23 is carried by the beam 11, said level being longitudinally bored to receive the extension 14 of said beam. The level can be applied to the beam with the level glass or bulb (24) immediately adjacent or in superimposed relationship to any one of the four sides of the extension 14. Corresponding sides of the beam and extension are in parallel planes. A set-screw 25 is tapped into the bottom or side of the level 23 which is opposite to that wherein the bulb 24 is located, and said set-screw is tightened against the extension 14, being adapted to engage any side of said extension, to hold said level in place thereon.

By changing the position of the level 23 on the beam extension 14, said level can be adapted for use when the instrument is inverted, or positioned with either side up. The rectangular shape in cross section of the base 1 facilitates the use of the instrument in these various positions, and groove 8 facilitates the use of said instrument on shafting.

Upon loosening the clamping screw or pivot 10, the protractor 9 can be swung or rocked on said pivot to bring into registry with the pointer 7 any mark on said protractor, and thus produce the required angular relationship between the base 1 and the level 23.

In order that this instrument may have a still wider range, I provide the same with an implement post 26. This post is tapped into the top of the beam 11 with the longitudinal center of said post at right-angles to said beam, but in the same plane with the longitudinal axis of the screw pivot 10. Various implements, one example of which is a test indicator, may be attached to the post 26 and used in conjunction with or as adjuncts to or auxiliary parts of the protractor-level proper. In Fig. 2, I have shown a micrometer gauge 27 supported from the post 26 by means of a bracket 28, said bracket being shown in Fig. 1 as well as in Fig. 2.

The bracket 28 is sleeved to the post 26 and consists in part of a split sleeve 29, and is provided with a set-screw 30, said set-screw passing through one of the arms of said sleeve into threaded engagement with the other arm of said sleeve, and through the latter arm to bear against the post 26. The micrometer gauge 27 is provided with a horizontal arm or rod 31 which is receivable in the split sleeve 29. When the set-screw 30 is loosened, the bracket 28 can be adjusted up and down and rotatably on the post 26, and the rod 31 can be inserted in the split sleeve 29 to any desired extent, and can be rotatably adjusted thereon. After the parts have been properly adjusted, the set-screw 30 is tightened, when the latter causes the sleeve 29 to close on and securely clamp the rod 31, and engages the post 26 with sufficient force to hold the parts in place on said post.

Any other suitable implement having a part to fit within the split sleeve 29 may be used in place of the micrometer gauge 27, and other means besides the bracket 28 may be substituted for said bracket as a medium for supporting an implement or implements from the post 26.

My instrument may be used on a planer for setting flat work, and with a micrometer to measure work upside down on a planer or shaper, or as a surface gauge for truing up work, and by millwrights for leveling shafting. Carpenters may employ the instrument, without any attachment, for the purpose of obtaining the pitch of a roof, which pitch will be found by setting the instrument to the corresponding angle. As either a vertical or horizontal level the instrument is also useful in most trades. It is useful, further, in jig work to obtain heights; on a lathe, if a face-plate be employed, to locate different spots on a jig or fixture; on a milling machine both for obtaining depth and leveling surfaces; on a drill-press for squaring either horizontal or vertical work, and, by turning the instrument on end, for leveling surfaces underneath which can not be leveled on top; and on a boring-mill for locating the work. The instrument can be used sideways if necessary, as where there is only a small space that is not easy of access, and said instrument is furthermore well adapted for assembling purposes, and for squaring off shafting.

More or less change in the size, shape, construction, and arangement of some or all of the parts of this instrument, in addition to those hereinbefore specifically pointed out, may be made without departing from the spirit of my invention or exceeding the scope of what is claimed.

What I claim as my invention, and desire to secure by Letters Patent, is—

1. The combination, in an instrument of the class described, with a supporting member, of a protractor having a straight edge, said supporting member and protractor being provided with cooperating scale elements, means pivotally to connect said protractor with said supporting member, and to lock said protractor to and release it from said supporting member, a beam superimposed on said protractor, means between said protractor and said beam at one terminal thereof, to retain said beam in parallel relation with said straight edge, and a spirit level carried by said beam.

2. The combination, in an instrument of the class described, with a supporting member, of a protractor having a straight edge, said supporting member and protractor being provided with cooperating scale elements, means pivotally to connect said protractor with said supporting member, and to lock said protractor to and release it from said supporting member, a beam superimposed on said protractor, means between said protractor and said beam at one terminal thereof, to retain said beam in parallel relation with said straight edge, a spirit level carried by said beam at the other terminal thereof, and a post carried by said beam, said post being for an implement that is adapted to cooperate with the supporting member for the purpose of determining distances between points or surfaces.

3. The combination, in an instrument of the class described, with a supporting member, of a protractor, said protractor and supporting member being provided with cooperating scale elements, a pivotal and locking and releasing connection between said protractor and supporting member, a beam superimposed on said protractor, a spirit level, and means to connect said level with said beam in any one of several positions, the adjustment of the level being such that its axis is always parallel to the longitudinal axis of said beam.

4. The combination, in an instrument of the class described, with a supporting member, of a protractor, said supporting member and protractor being provided with cooperating scale elements, means pivotally to connect said protractor with said supporting member, and to lock said protractor to and release it from said supporting member, a beam mounted on said pivotal means above said protractor, a post carried by said beam, a bracket for said post, said bracket consisting in part of means for holding an implement which is adapted to cooperate with said supporting member in determining distances between points or surfaces, and means to secure said bracket to said post.

5. The combination, in an instrument of the class described, with a base and a support rising therefrom, said support being cut away to form an arcuate recess, of a protractor receivable in said recess, said protractor and support being provided with cooperating scale elements, a binding pivot screw passing through said protractor and tapped into said support, a beam having depending lugs perforated to receive and mounted on said screw, means to retain said beam in proper relationship to said protractor, and a spirit level carried by said beam.

6. The combination, in an instrument of the class described, with a base and a support rising therefrom, said support being cut away to form an arcuate recess, of a protractor receivable in said recess, said protractor and support being provided with cooperating scale elements, a binding pivot screw passing through said protractor and tapped into said support, a beam having depending lugs perforated to receive and mounted on said screw, means to retain said beam in proper relationship to said protractor, and a post, for an implement adapted to cooperate with said base in determining distances between points or surfaces carried by said beam.

7. The combination, in an instrument of the class described, with a supporting member, of a protractor, said supporting member and protractor being provided with cooperating scale elements, means pivotally to connect said protractor with said supporting member, a beam mounted on said pivotal means above said protractor, said beam having therein adjacent to one end a recess which opens through the top of the beam, and a passage which leads from the bottom of said recess to the bottom of the beam, a head in said recess, and an adjusting screw extending through said passage into threaded engagement with said head, and having its outer end tapped into said protractor.

8. The combination, in an instrument of the class described, with a supporting member, of a protractor, said supporting member and protractor being provided with co-operating scale elements, a pivotal connection between said protractor and supporting member, said pivotal connection being adapted to lock said protractor to and release it from said supporting member, a beam superimposed on said protractor and provided with an extension, and a spirit level having therein a perforation to receive and fit in any one of various positions said extension, and correspondingly dispose the level bulb, the longitudinal axis of said beam and spirit level being parallel in all positions.

9. The combination, in an instrument of the class described, with a supporting member, of a protractor, said protractor and supporting member being provided with co-operating scale elements, a pivotal connection between said protractor and supporting member, said pivotal connection being adapted to lock said protractor to and release it from said supporting member, a beam superimposed on said protractor, a post carried by said beam, a bracket sleeved to said post and consisting in part of a split sleeve designed to receive a supporting part of an implement adapted to co-operate with said supporting member in determining distance between points or surfaces, and a set-screw adapted to contract the split parts of said sleeve and to engage said post.

ROBERT A. CECCHINI

Witnesses:
F. A. CUTTER,
R. E. ALLBEE.